United States Patent
Cho et al.

(10) Patent No.: US 10,928,081 B2
(45) Date of Patent: Feb. 23, 2021

(54) DEHUMIDIFIER

(71) Applicant: Samsung Electronics Co., Ltd, Suwon-si (KR)

(72) Inventors: Sung June Cho, Suwon-si (KR); Seong Su Kim, Suwon-si (KR); Eun Jae Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 15/760,602

(22) PCT Filed: Sep. 12, 2016

(86) PCT No.: PCT/KR2016/010259
§ 371 (c)(1),
(2) Date: Mar. 15, 2018

(87) PCT Pub. No.: WO2017/048012
PCT Pub. Date: Mar. 23, 2017

(65) Prior Publication Data
US 2019/0041071 A1    Feb. 7, 2019

(30) Foreign Application Priority Data
Sep. 15, 2015   (KR) .................. 10-2015-0130178

(51) Int. Cl.
*F24F 3/14*     (2006.01)
*G01F 23/26*    (2006.01)
(Continued)

(52) U.S. Cl.
CPC .............. *F24F 3/14* (2013.01); *F24F 13/222* (2013.01); *G01F 23/26* (2013.01); *F24F 13/20* (2013.01);
(Continued)

(58) Field of Classification Search
CPC .... F24F 3/1405; F24F 3/02; F24F 3/04; F24F 3/06; F24F 3/065; F24F 3/08; F24F 3/10;
(Continued)

(56) References Cited

U.S. PATENT DOCUMENTS 4,742,691 A * 5/1988 Kennedy ................. F24F 13/22
                                                    62/272
2010/0064705 A1* 3/2010 Chauvin ................. F04B 49/02
                                                    62/150
(Continued)

FOREIGN PATENT DOCUMENTS

CN    200968681 Y    10/2007
JP    02-116399 A    5/1990
(Continued)

OTHER PUBLICATIONS

International Search Report dated Dec. 13, 2016 in connection with International Patent Application No. PCT/KR2016/010259.
(Continued)

*Primary Examiner* — David J Teitelbaum

(57) ABSTRACT

Disclosed herein is a dehumidifier having a structure improved to detect whether a water container is installed on a main body and the water container is full with water.
A dehumidifier comprising a main body including a suction port and a discharge port, a heat exchanger in which a refrigerant configured to exchange heat with air introduced through the suction port circulates, a water container separably installed on the main body and configured to store condensate generated in a process in which the air introduced through the suction port exchanges heat with the refrigerant and a sensor module provided in the main body to detect whether the water container is installed on the main body and detect a water level of the water container.

11 Claims, 14 Drawing Sheets

(51) Int. Cl.
*F24F 13/22* (2006.01)
*F24F 13/20* (2006.01)
*F24F 140/30* (2018.01)

(52) U.S. Cl.
CPC ... *F24F 2003/1446* (2013.01); *F24F 2140/30* (2018.01)

(58) Field of Classification Search
CPC .. F24F 3/14; F24F 13/222; F24F 13/20; F24F 2003/1446; F25D 21/14; G01F 23/26
See application file for complete search history.

(56) References Cited

U.S. PATENT DOCUMENTS

| | | | |
|---|---|---|---|
| 2012/0125018 A1* | 5/2012 | Shaha | F25C 5/182 62/66 |
| 2013/0000337 A1* | 1/2013 | Krause | B67D 1/0888 62/177 |
| 2015/0184875 A1 | 7/2015 | Lee | |

FOREIGN PATENT DOCUMENTS

| | | |
|---|---|---|
| KR | 20-0410801 Y1 | 3/2006 |
| KR | 10-2011-0023478 A | 3/2011 |
| KR | 10-2014-0110651 A | 9/2014 |
| KR | 10-2015-0075749 A | 7/2015 |

OTHER PUBLICATIONS

Written Opinion of the International Searching Authority dated Dec. 13, 2016 in connection with International Patent Application No. PCT/KR2016/010259.
Office Action dated Sep. 9, 2019 in connection with Chinese Patent Application No. 201680053760.6, 15 pages.
The Second Office Action in connection with Chinese Application No. 201680053760.6 dated May 8, 2020, 16 pages.
Examination report in connection with Indian Application No. 201817014062 dated May 20, 2020, 8 pages.
Office Action dated Nov. 2, 2020 in connection with Chinese Patent Application No. 201680053760.6, 12 pages.

\* cited by examiner

[Fig. 1]
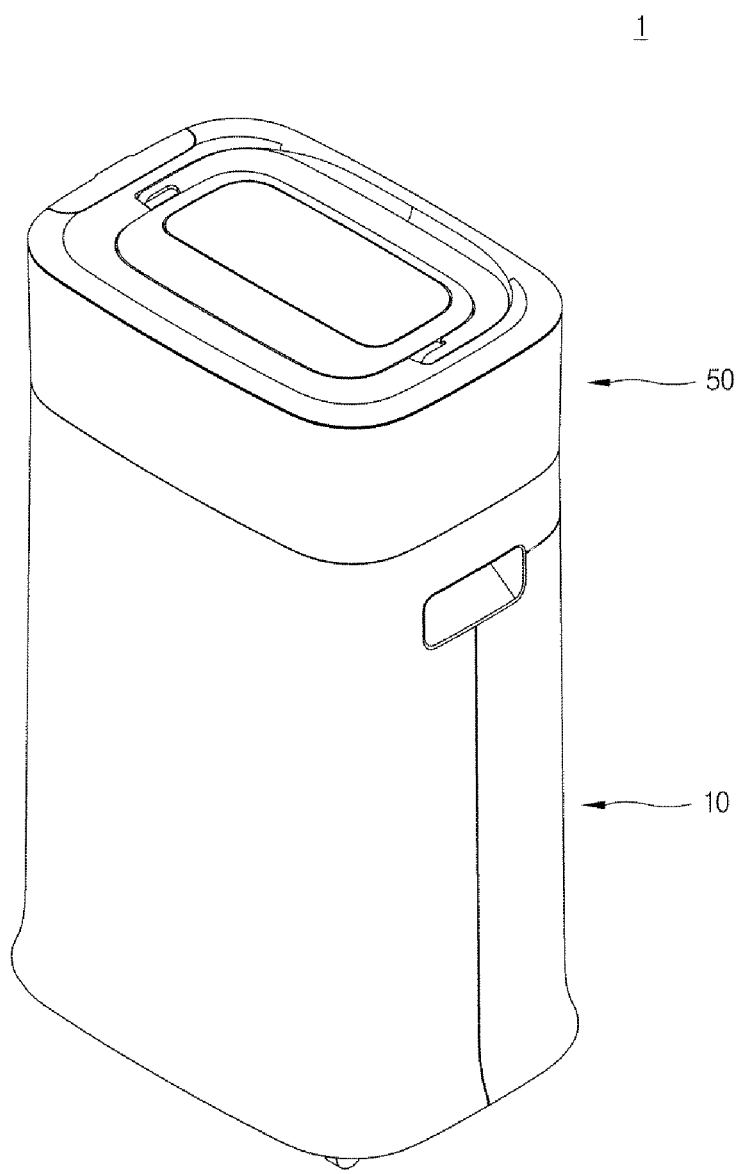

[Fig. 2]
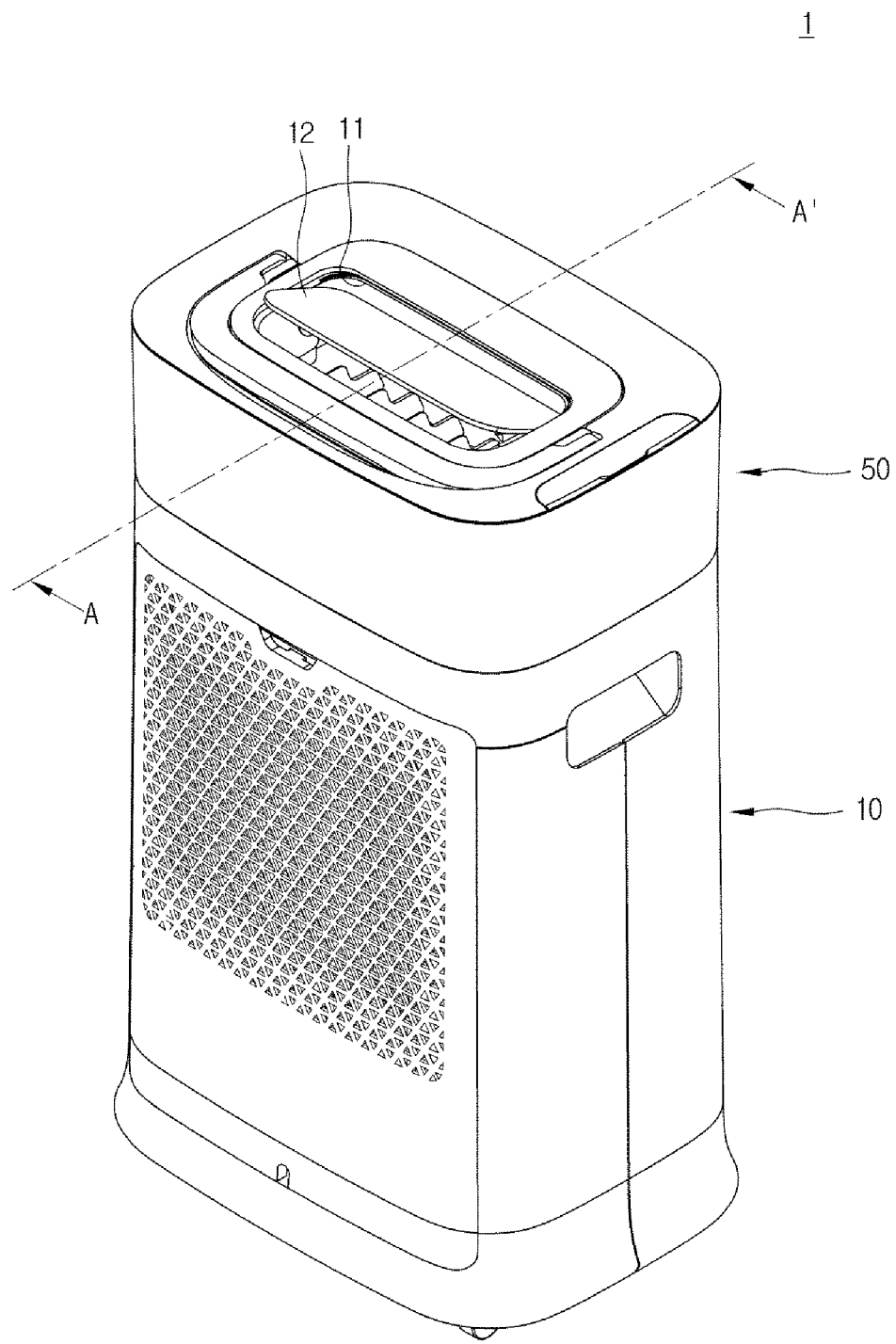

【Fig. 3】
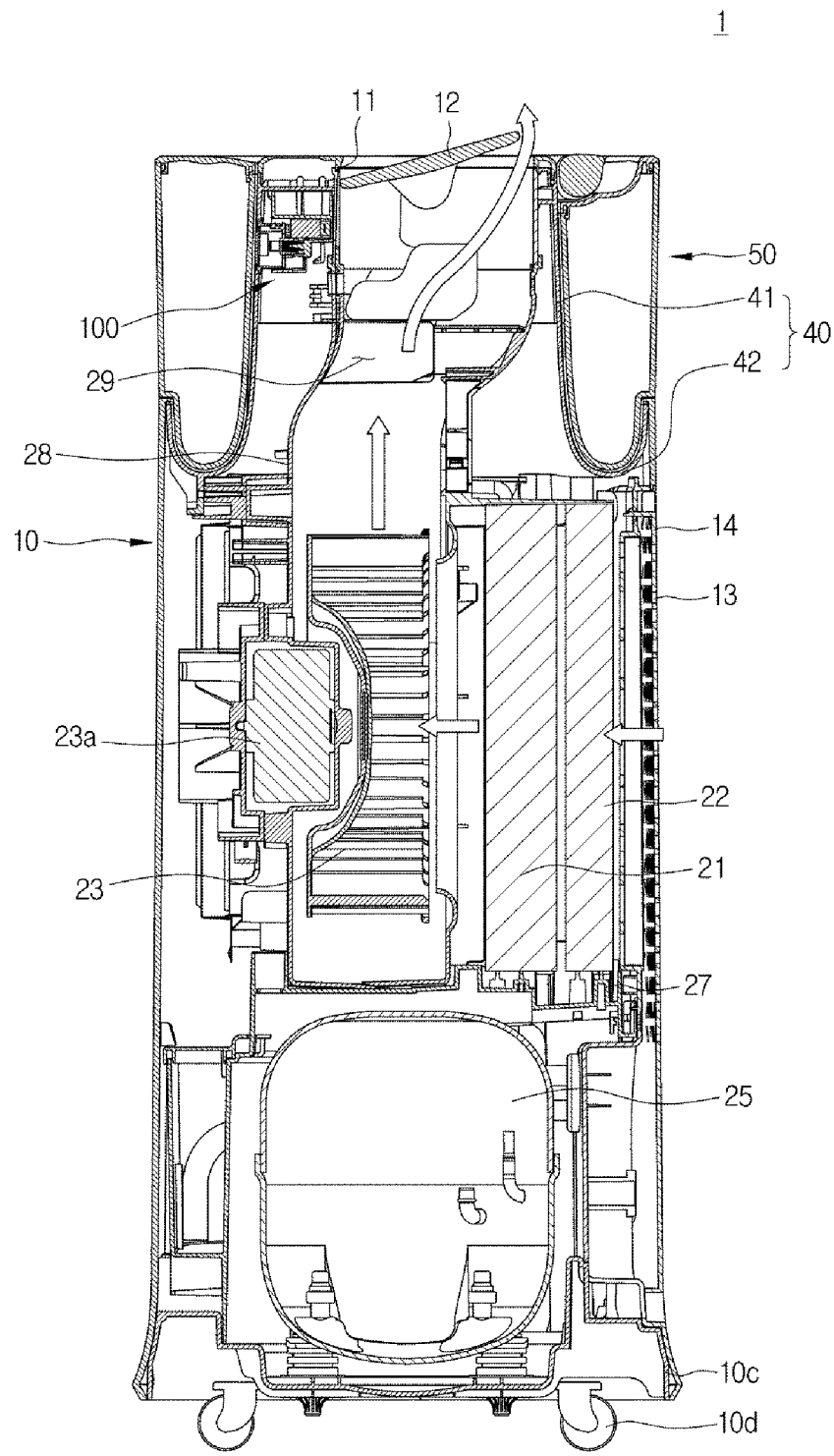

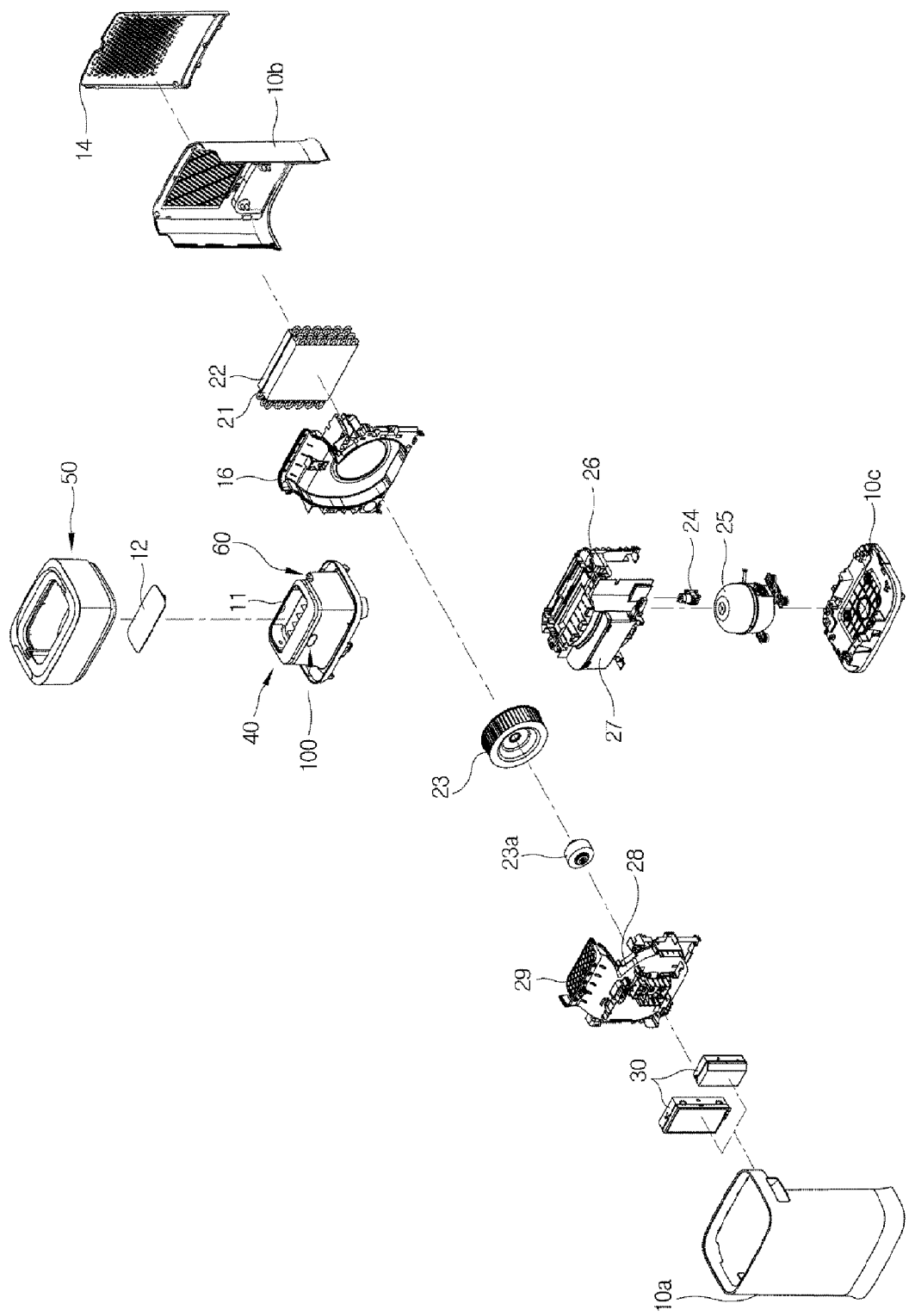

[Fig. 5]
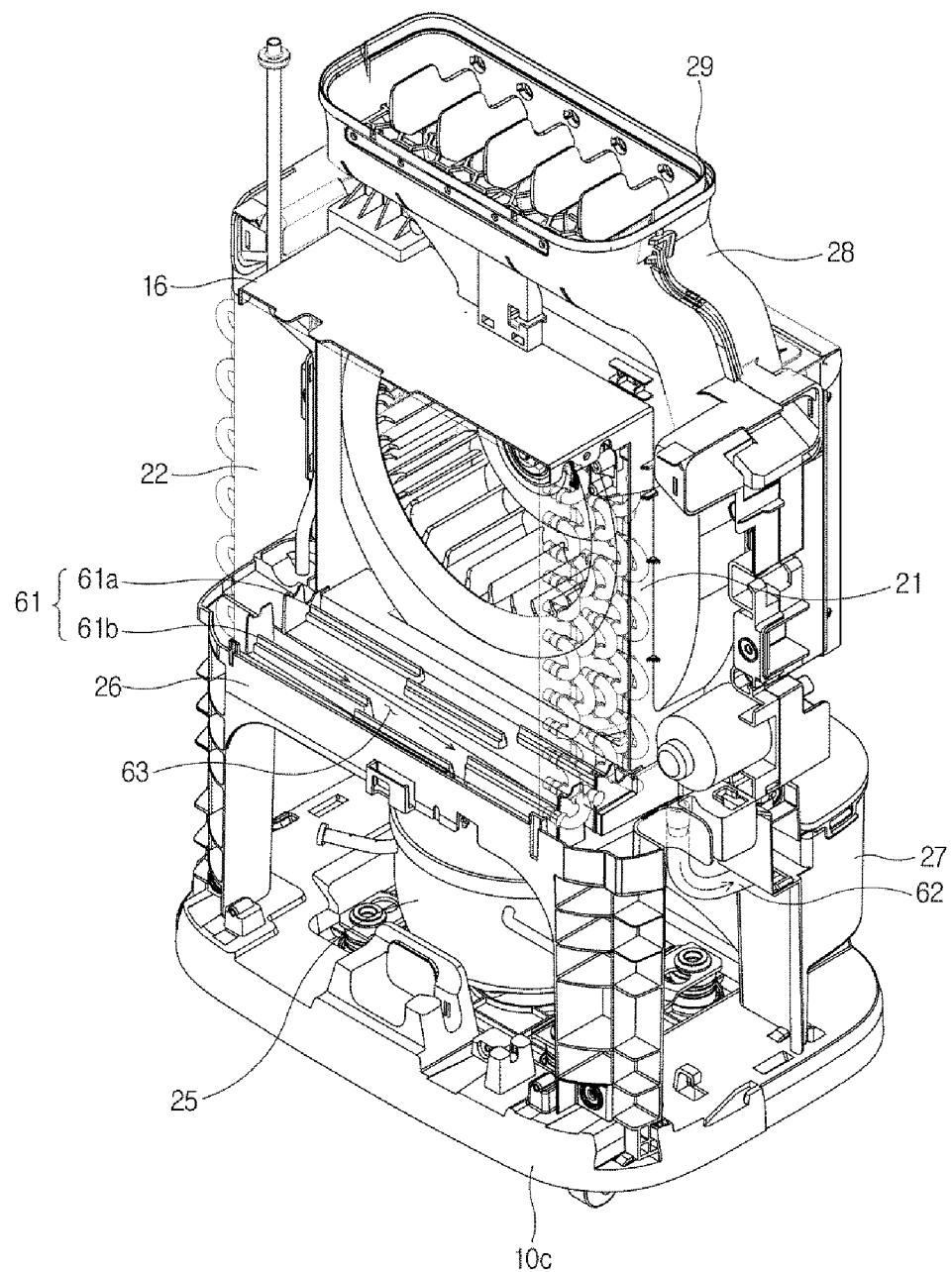

[Fig. 6]
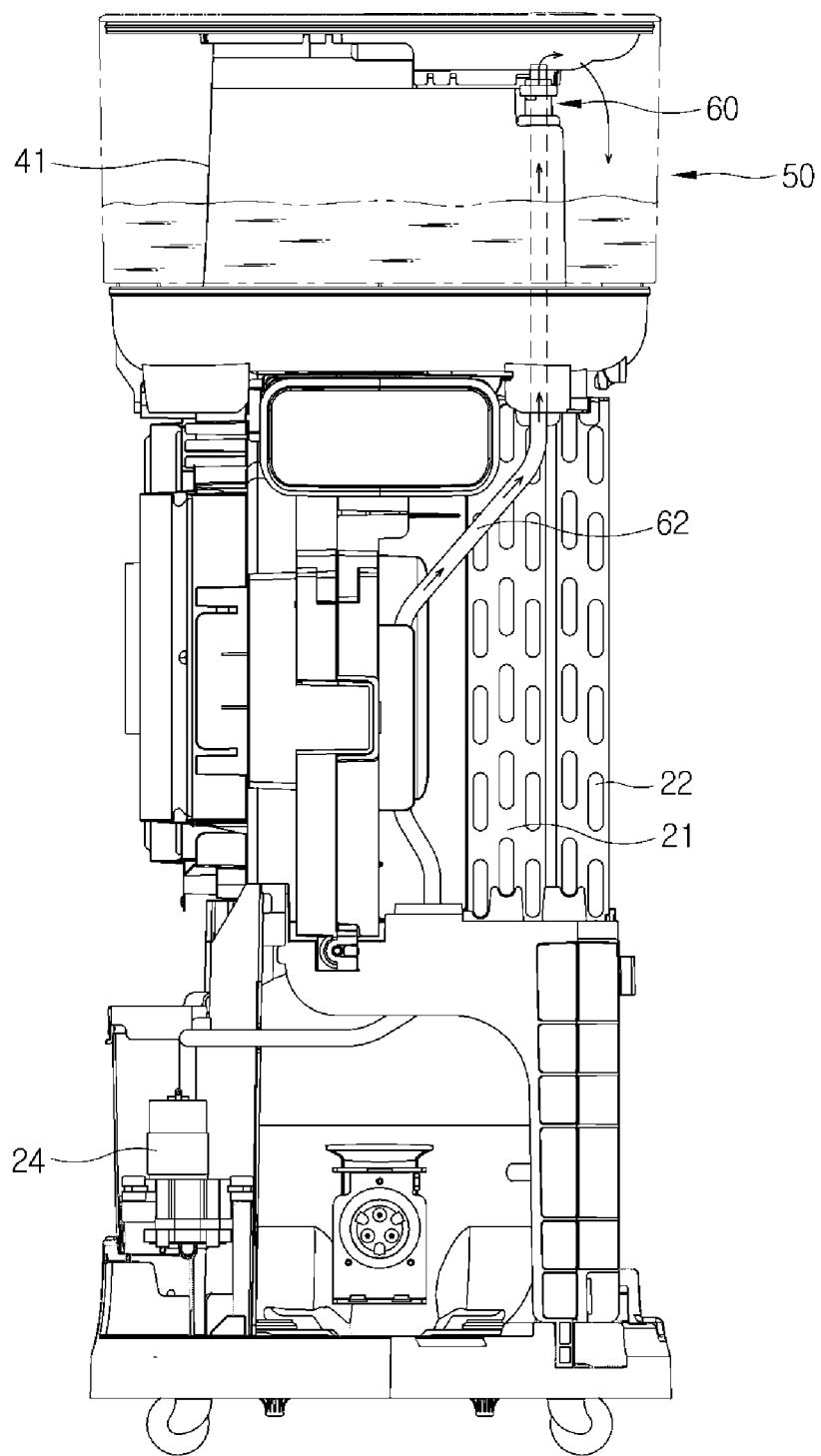

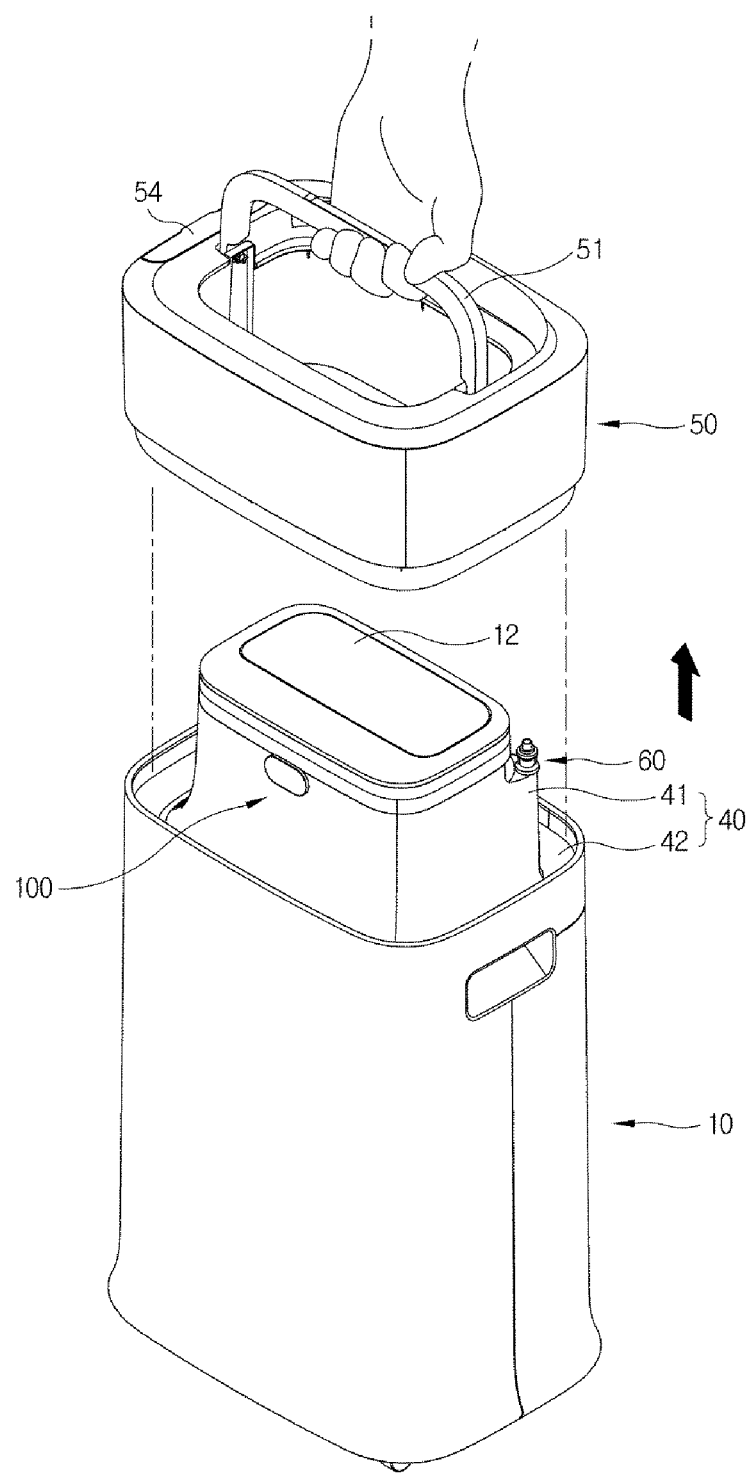
[Fig. 7]

[Fig. 8]
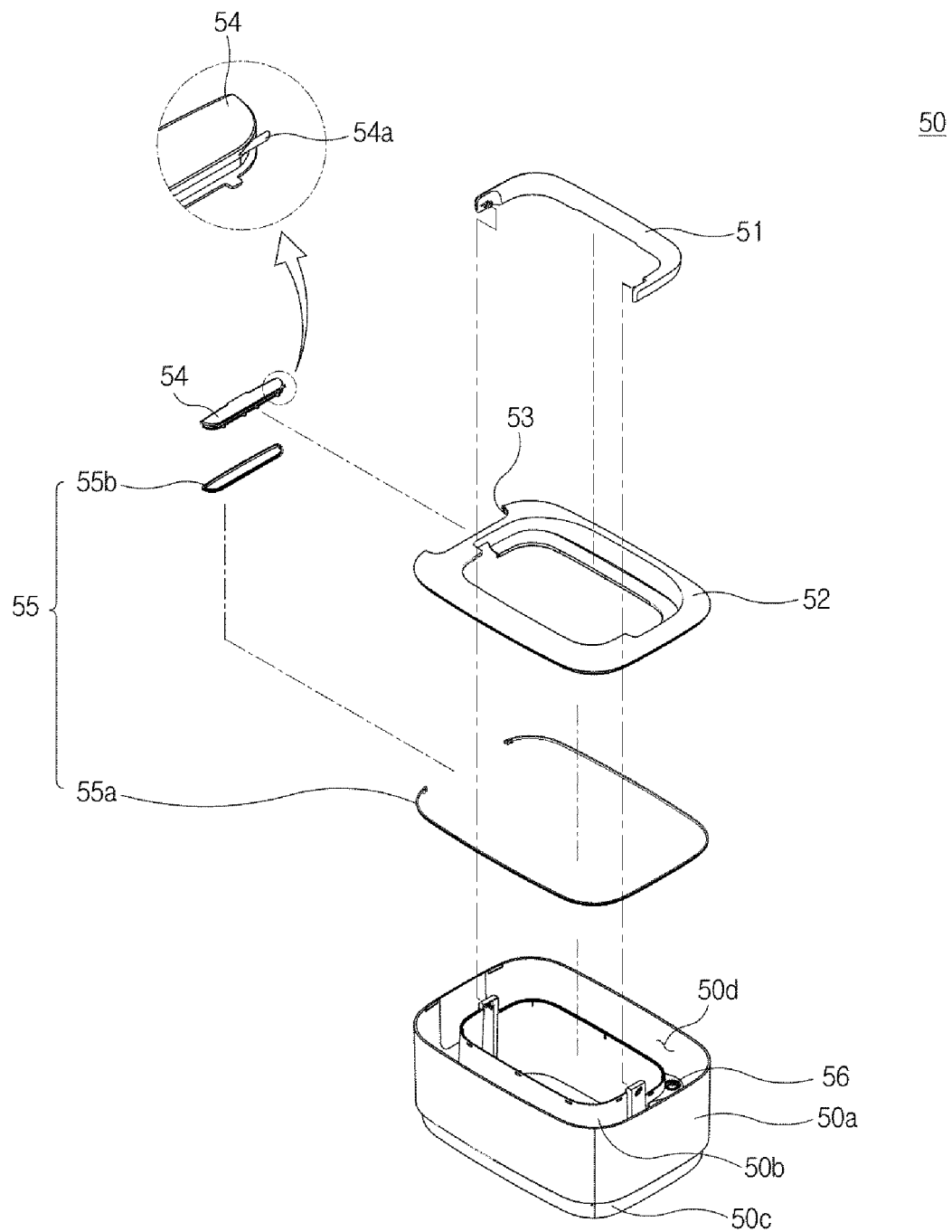

[Fig. 9]
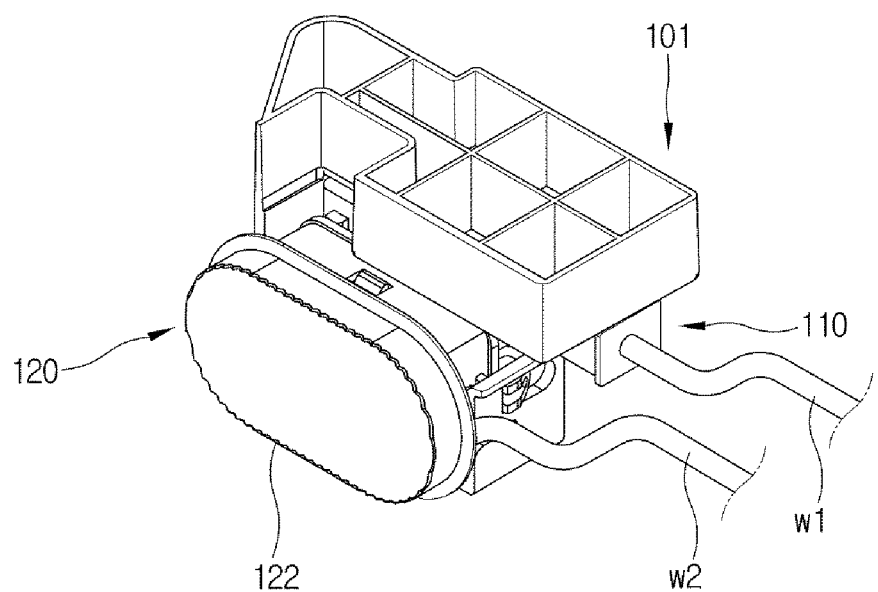

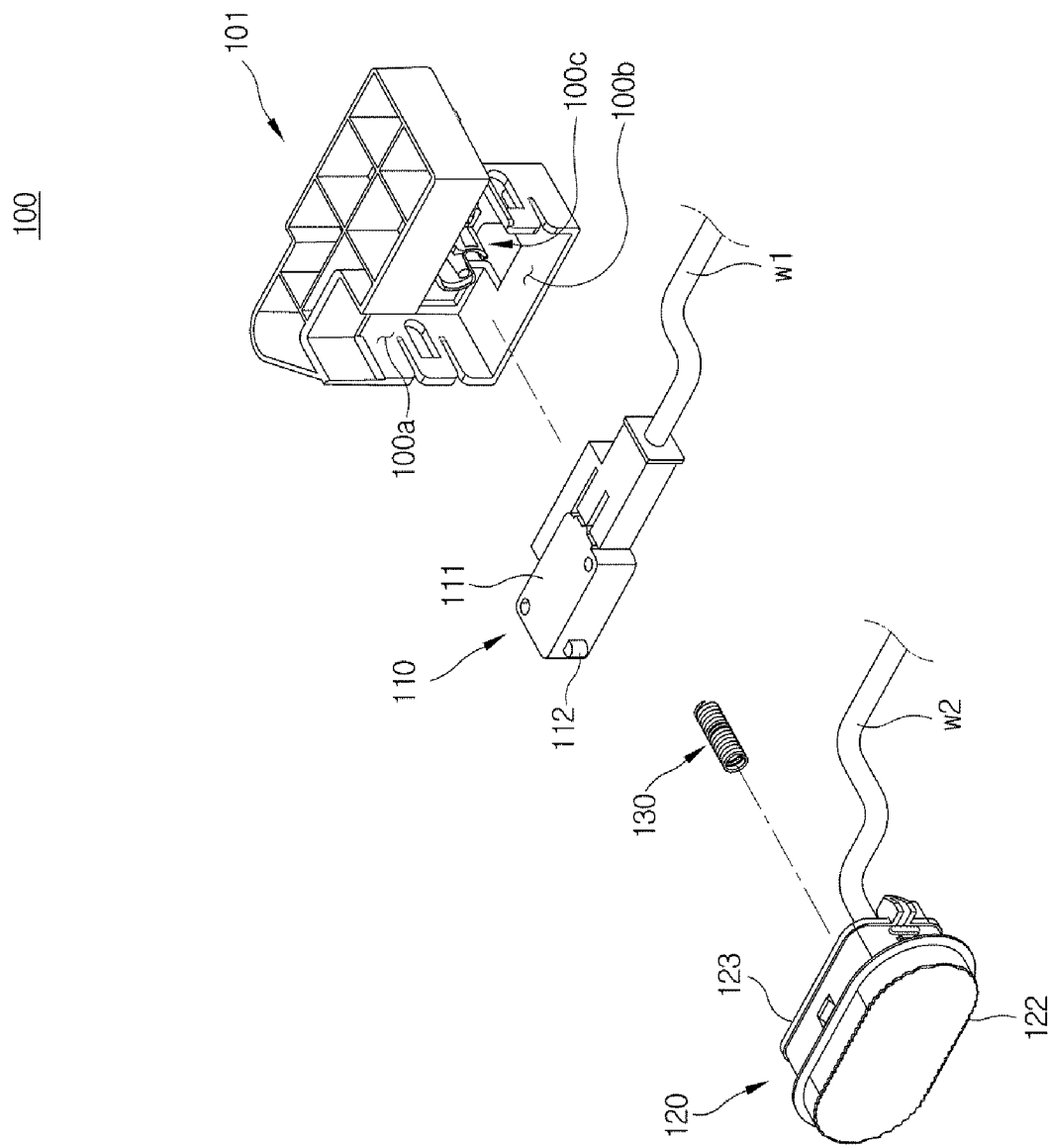
[Fig. 10]

[Fig. 11]
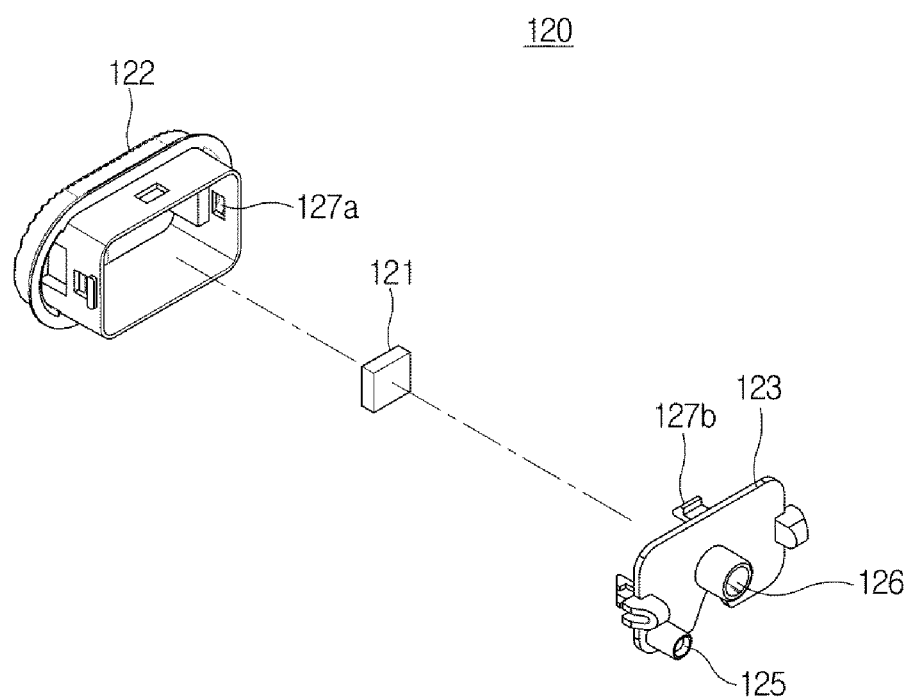

[Fig. 12]
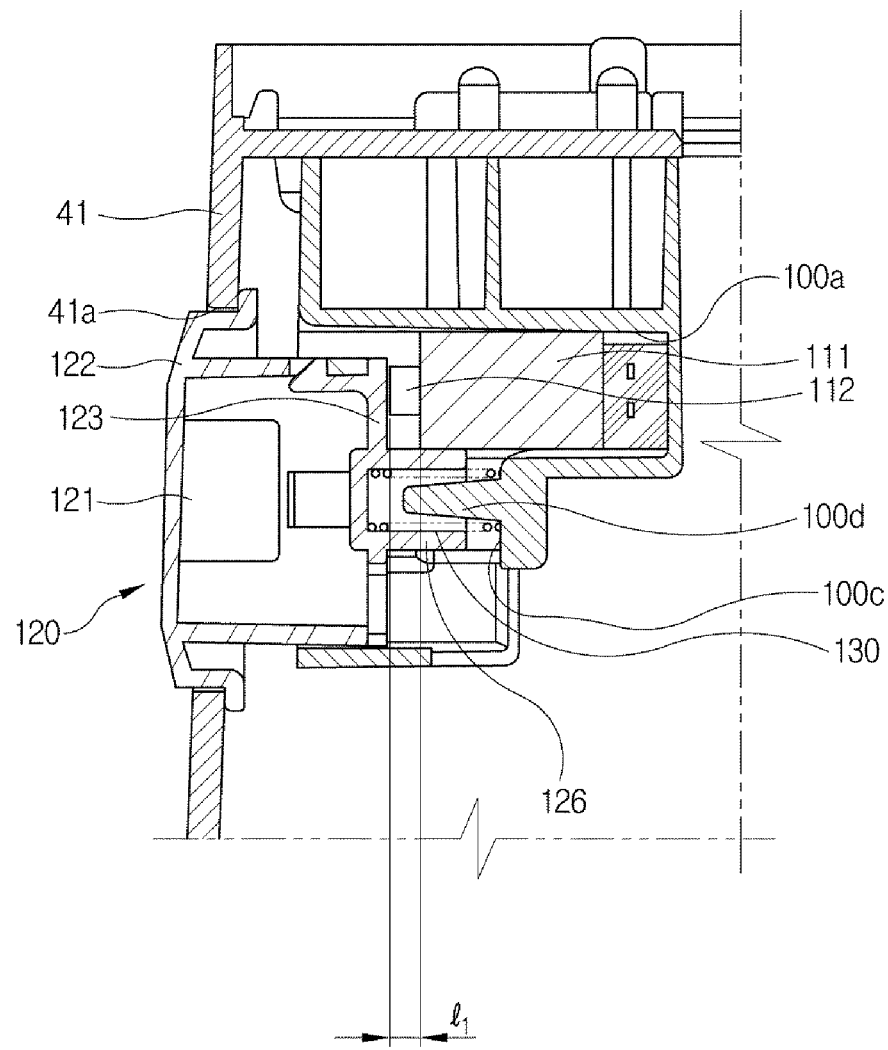

[Fig. 13]
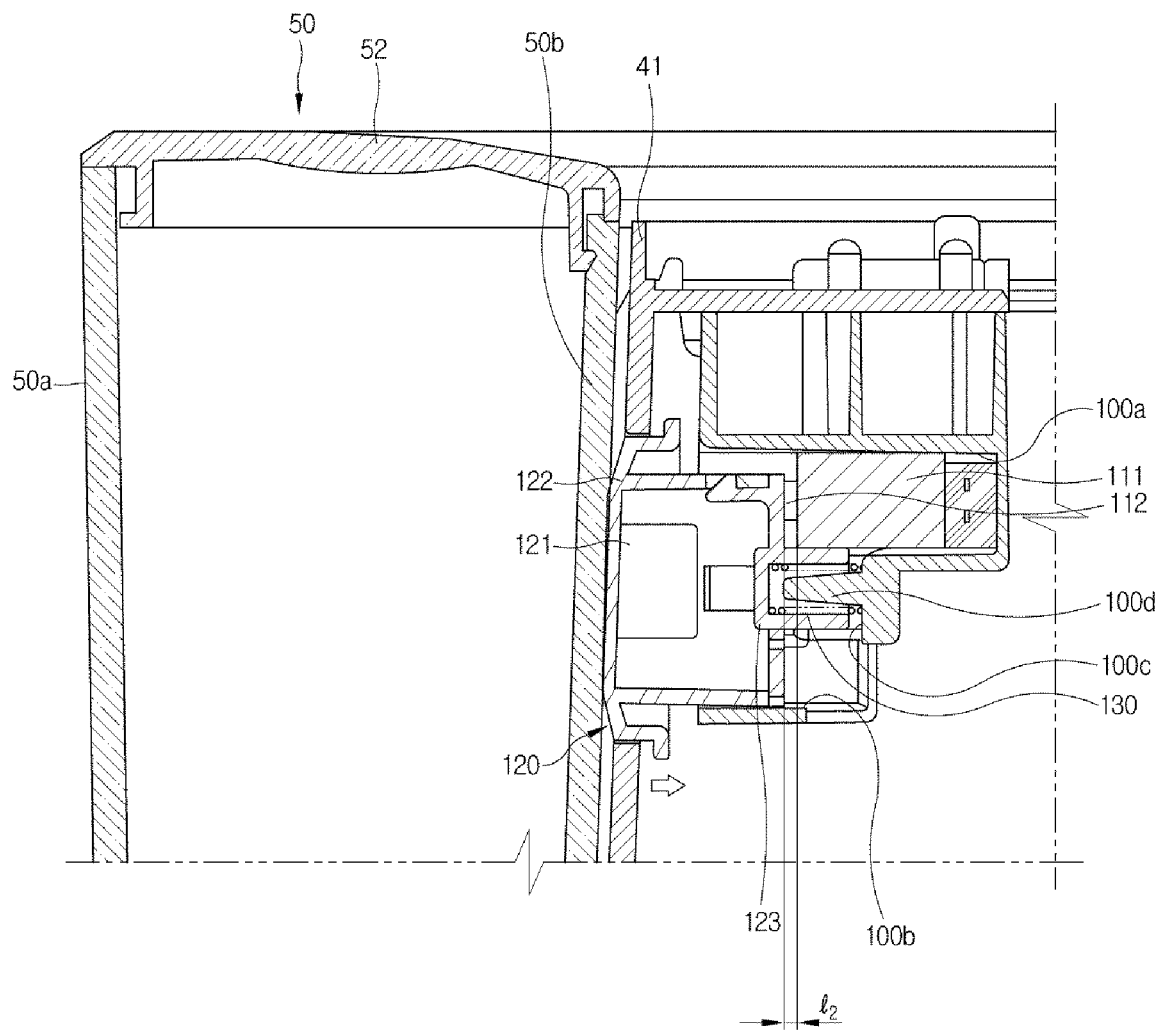

【Fig. 14】
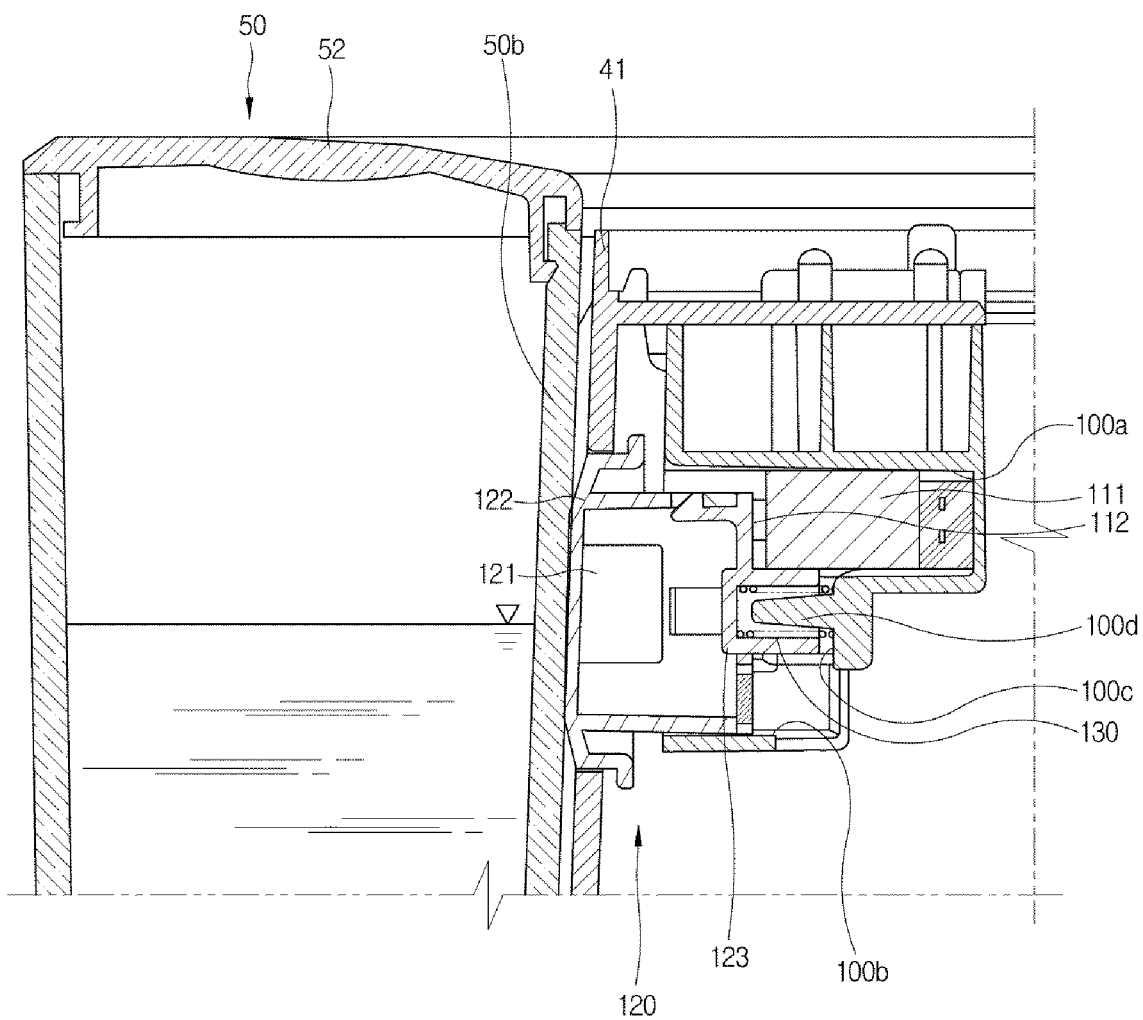

DEHUMIDIFIER

CROSS-REFERENCE TO RELATED APPLICATIONS AND CLAIM OF PRIORITY

The present application is a 371 National Stage of International Application No. PCT/KR2016/010259 filed on Sep. 12, 2016, which claims the benefit of Korean Patent Application No. 10-2015-0130178 filed on Sep. 15, 2015, the contents of which are incorporated herein by reference.

TECHNICAL FIELD

Embodiments of the present disclosure relate to a dehumidifier, and more particularly, to a dehumidifier having a structure improved to detect whether a water container is installed on a main body and the water container is full with water.

BACKGROUND

Generally, a dehumidifier is an apparatus in which, after a main body suctions humid air in an interior space and passes the air through a heat exchanger including a condenser and an evaporator through which a refrigerant flows and lowers humidity of the air, the dehumidified air is discharged to the interior space to lower humidity of the interior space.

That is, in a dehumidifier, an evaporator evaporates a liquid-state refrigerant to absorb heat from nearby air, and while the refrigerant evaporates, a temperature of the evaporator decreases, and a temperature of air passing through the evaporator is also lowered.

Accordingly, as a temperature of air near the evaporator is lowered, moisture included in the air condenses and forms dew on a surface of the evaporator.

A dehumidifier may include a water container configured to store condensate formed on a surface of an evaporator. Specifically, the water container may be provided to be separable from a main body of the dehumidifier.

A dehumidifier operates when a water container is installed on a main body and the water container is not full with water. However, the dehumidifier does not operate when the water container is separated from the main body or the water container is full with water. Accordingly, since it can be important to determine whether the water container is installed on the main body and the water container is full with water in order to determine whether the dehumidifier is operating, studies on methods of effectively detecting whether a water container is installed on a main body and the water container is full with water are actively being conducted.

SUMMARY

The present disclosure is directed to providing a dehumidifier having an improved structure in which one sensor module is capable of detecting whether a water container is installed on a main body and whether the water container is full with water.

The present disclosure is also directed to providing a dehumidifier having an improved structure in which an inexpensive sensor module having a simple structure is capable of detecting whether a water container is installed on a main body and whether the water container is full with water.

The present disclosure is also directed to providing a dehumidifier having an improved structure in which a water container configured to store condensate generated by a cooler is capable of being easily emptied when full with water and then installed in the dehumidifier.

In accordance with an aspect of the present disclosure, a dehumidifier comprising: a main body including a suction port and a discharge port; a heat exchanger in which a refrigerant configured to exchange heat with air introduced through the suction port circulates; a water container separably installed on the main body and configured to store condensate generated in a process in which the air introduced through the suction port exchanges heat with the refrigerant; and a sensor module provided in the main body to detect whether the water container is installed on the main body and detect a water level of the water container.

The sensor module includes a first sensor configured to detect the installation of the water container; and a second sensor configured to detect the water level of the water container.

The sensor module includes a micro switch; and a capacitive touch sensor.

The first sensor includes a micro switch.

The second sensor includes a capacitive touch sensor.

The sensor module is provided to be pressed by the water container and to move away from the water container during the installation of the water container; and to move toward the water container during separation of the water container.

The second sensor is moved by the water container and turns on the first sensor during the installation of the water container; and turns off the first sensor during separation of the water container.

The first sensor cooperates with the second sensor.

The sensor module includes a sensor case configured to accommodate the first sensor and the second sensor; and an elastic member configured to elastically support the second sensor from the sensor case to move the second sensor toward the water container.

The second sensor detects a capacitance of water when the water container is full with water The dehumidifier further comprising a water container installation portion provided on the main body to allow the water container to be installed, wherein the sensor module is provided in the water container installation portion.

The dehumidifier further comprising a drain port provided in the water container installation portion so as to be connected to the water container during the installation of the water container and separated from the water container during separation of the water container.

According to one aspect of the present disclosure, since a water container configured to store condensate generated by a cooler is detachably provided in an upper portion of a dehumidifier, the water container can be easily emptied when full with water and then installed in the dehumidifier.

In addition, since one sensor module can detect whether a water container is installed on a main body and whether the water container is full with water, a structure of a humidifier can be simplified and reliability thereof can be improved.

In addition, since mechanical sensing and electrical sensing are performed together, control is easy and sensing reliability is high, and thus malfunction can be minimized.

BRIEF DESCRIPTION OF THE DRAWINGS

FIG. 1 is a perspective view illustrating a dehumidifier according to one embodiment of the present disclosure such that a front surface thereof is seen, FIG. 2 is a perspective view illustrating the dehumidifier according to one embodiment of the present disclosure such that a rear surface thereof is seen, FIG. 3 is a cross-sectional view taken along line A-A' of FIG. 2, FIG. 4 is an exploded perspective view illustrating the dehumidifier according to one embodiment of the present disclosure, FIGS. 5 to 6 are views illustrating a path through which condensate generated in the dehumidifier according to one embodiment of the present disclosure moves sequentially, FIG. 7 is a view illustrating an operation in which the water container is separated from the dehumidifier according to one embodiment of the present disclosure, FIG. 8 is an exploded perspective view illustrating the water container of the dehumidifier according to one embodiment of the present disclosure, FIG. 9 is a perspective view illustrating a sensor module of FIG. 7.

FIG. 10 is a perspective view illustrating the sensor module according to one embodiment of the present disclosure, FIG. 11 is an exploded perspective view illustrating the sensor module according to one embodiment of the present disclosure, FIG. 12 is a cross-sectional view taken along line B-B' of FIG. 7 when the sensor module operates in a case in which the water container of the dehumidifier according to one embodiment of the present disclosure has been separated from a main body, FIG. 13 is a view illustrating a state in which the sensor module operates in a case in which the water container of the dehumidifier according to one embodiment of the present disclosure is installed in the main body, FIG. 14 is a view illustrating a state in which the sensor module operates in a case in which the water container installed on the main body is full with water in the dehumidifier according to one embodiment of the present disclosure.

DETAILED DESCRIPTION

Hereinafter, an exemplary embodiment of the present disclosure will be described in detail with reference to the accompanying drawings. Meanwhile, terms used in the specification, such as "front end," "back end," "upper portion," "lower portion," "upper end," and "lower end" are defined on the basis of the drawings, and forms and positions of components are not limited to the terms.

FIG. 1 is a perspective view illustrating a dehumidifier according to one embodiment of the present disclosure such that a front surface thereof is seen, FIG. 2 is a perspective view illustrating the dehumidifier according to one embodiment of the present disclosure such that a rear surface thereof is seen, FIG. 3 is a cross-sectional view taken along line A-A' of FIG. 2, FIG. 4 is an exploded perspective view illustrating the dehumidifier according to one embodiment of the present disclosure, and FIGS. 5 to 6 are views illustrating a path through which condensate generated in the dehumidifier according to one embodiment of the present disclosure moves sequentially.

As illustrated in FIGS. 1 to 6, a dehumidifier 1 includes a main body 10 forming an exterior and including a suction port 13 and a discharge port 11 and a water container 50 detachably provided above the main body 10.

The main body 10 includes a refrigerating cycle apparatus including a blower fan 23 configured to forcibly move air, a compressor 25 configured to compress a refrigerant, a condenser (heat exchanger) 21 configured to condense the refrigerant and emit latent heat to the outside, an expending valve (not shown) configured to expend the refrigerant, and an evaporator (a cooler, a heat exchanger) 22 configured to evaporate the refrigerant to absorb external heat and condense water vapor in the surrounding air.

In addition, the main body 10 includes a drain duct 26 configured to guide condensate generated by the evaporator 22, a water collecting tray 27 configured to collect the condensate guided by the drain duct 26, a pump 24 configured to pump the condensate collected in the water collecting tray 27 to the water container 50, and a drain pipe 62 configured to guide the condensate pumped by the pump 24 to the water container 50 above the main body 10.

Air suctioned through the suction port 13 of the main body 10 may flow through the evaporator 22 of the refrigerating cycle apparatus and be cooled and dehumidified, and afterward the air heated and dried by passing through the condenser 21 may be discharged to the outside of the main body 10 via the discharge port 11.

In the embodiment of the present disclosure, the dehumidifier is illustrated and described as using the refrigerating cycle apparatus, but the spirit of the present disclosure is not limited thereto. For example, dehumidification may also be performed using an adsorbent. When water vapor is adsorbed on the adsorbent, the adsorbed water is vaporized by a heater, and the vaporized water may be condensed through a heat exchanger.

Meanwhile, the main body 10 may include a front case 10a configured to form a front surface, a rear case 10b coupled to the front case 10a to form a rear surface, a bottom case 10c forming a bottom, and a support frame 16 provided between the front case 10a and the rear case 10b and configured to support various components.

Wheels 10d provided to easily move the main body 10 may be provided on the bottom case 10c.

The suction port 13 may be formed in the rear surface of the main body 10, and the discharge port 11 may be formed at an upper side of the main body 10. In the embodiment of the present disclosure, although the discharge port formed at the upper side of the main body is illustrated as an example, the spirit of the present disclosure is not limited thereto. For example, the discharge port may also be formed in a front case of the main body.

A suction grill 14 configured to filter out foreign material may be provided in the suction port 13, and a discharge port cover 12 configured to adjust a direction in which air is discharged or open and close the discharge port 11 may be provided in the discharge port 11.

The refrigerating cycle apparatus including the compressor 25, the condenser 21, the expending valve, and the evaporator 22 is provided in the main body 10. The compressor 25 may be disposed in a lower portion of the main body 10, the evaporator 22 may be disposed adjacent to the suction port 13 located behind the evaporator 22, and the condenser 21 may be disposed in front of the evaporator 22.

The blower fan 23 receives a rotating force from a driving motor 23a so as to be rotatable. The blower fan 23 may suction air from a rear of the main body 10, forcibly move the air through the evaporator 22 and the condenser 21 sequentially, and discharge the air above the main body 10. An air current guide 28 for guiding an air current may be provided in the main body 10. The blower fan 23 may be a radial fan configured to suction and discharge air in an axial direction, and an air current outlet 29 formed at a location corresponding to the discharge port 11 of the main body 10 may be provided in the air current guide 28.

In addition, a machine box 30 for various components may be provided in a lower portion in the main body 10.

Accordingly, air suctioned in the main body 10 may be cooled below the dew point by the evaporator 22, water vapor contained in the air may be condensed, and the dried air may be heated by passing through the condenser 21 and discharged to the outside of the main body 10 in a state in which relative humidity of the air has decreased.

Condensate condensed by the evaporator 22 may flow down along the evaporator 22 and fall below the evaporator 22, and a drain duct 26 configured to guide the falling condensate may be provided below the evaporator 22.

A drain duct 26 may guide the condensate to the water collecting tray 27, and to this end, the drain duct 26 may be formed to be slanted toward the water collecting tray 27. A drain duct 26 may be formed to have a size corresponding to and covering an entire area of the evaporator 22. A drain path 63 configured to accommodate the condensate and formed to be slanted such that the condensate flows toward the water collecting tray 27 may be provided in the drain duct 26. An installation portion 61 for installing the evaporator 22 and the condenser 21 may be provided in the drain duct 26.

The installation portion 61 of a drain duct 26 may include a first installation portion 61a for installing the evaporator 22 and a second installation portion 61b for installing the condenser 21. The first installation portion 61a and the second installation portion 61b are formed such that the drain path 63 through which the condensate fallen from the evaporator 22 flows is separated from the evaporator 22 and the condenser 21.

The water collecting tray 27 is provided to store the condensate. In the embodiment, although a drain duct 26 and the water collecting tray 27 are illustrated as being separately formed, the spirit of the present disclosure is not limited thereto. For example, the drain duct and the water collecting tray may also be integrally formed.

Meanwhile, a water level sensor (not shown) may be provided in the water collecting tray 27. When the water collecting tray 27 is full with water or a water level of the water collecting tray 27 reaches a predetermined water level, the pump 24 may operate to pump the condensate in the water collecting tray 27.

The pump 24 may be a centrifugal pump including a pump motor (not shown) configured to generate a rotating force and a rotary blade (not shown) configured to receive the rotating force from the pump motor to rotate. The condensate pumped by the pump 24 may be guided by the drain pipe 62 to the water container 50 provided above the main body 10.

A water container installation portion 40 may be provided on the main body 10 such that the water container 50 is installed.

FIG. 7 is a view illustrating an operation in which the water container is separated from the dehumidifier according to one embodiment of the present disclosure, FIG. 8 is an exploded perspective view illustrating the water container of the dehumidifier according to one embodiment of the present disclosure, and FIG. 9 is a perspective view illustrating a sensor module of FIG. 7.

As illustrated in FIGS. 7 to 9, the water container installation portion 40 on which the water container 50 is installed may include a first support 41 and a second support 42 which form a space in which the water container 50 is installed.

The space in which the water container 50 is installed is formed on the water container installation portion 40. The water container installation portion 40 may include the first support 41 configured to support a side surface of the water container 50 and the second support 42 configured to support a bottom surface thereof in order to allow the water container 50 to be installed.

The first support 41 and the second support 42 of the water container installation portion 40 may be connected.

A fixing member (not shown) configured to fix the water container 50 when the water container 50 is installed may be provided in the water container installation portion 40. The water container 50 installed in the water container installation portion 40 may be disposed at a higher location than the evaporator 22 or disposed at at least the same height as the evaporator 22.

As described above, since the water container 50 is provided above the main body 10 of the dehumidifier 1, when the water container 50 is full with water, a user may easily separate and empty the water container 50 and easily install the water container 50 after emptying the water container 50.

The water container 50 has a substantially box form, but is not limited thereto. The form of the water container 50 is not limited. The water container 50 includes an outer surface portion 50a provided to form an accommodating space 50d in which condensate is accommodated, an inner surface portion 50b, and a bottom surface portion 50c configured to connect the outer surface portion 50a and the inner surface portion 50b and configured to form a bottom.

A water container cover 52 detachably coupled to the water container 50 may be provided on the water container 50. The water container cover 52 is provided in a form corresponding to a form of the water container 50 such that condensate in the water container 50 does not leak to the outside. A water discharge port 53 through which condensate stored in the water container 50 may be emptied out may be provided in the water container cover 52, and a water discharge port cover 54 may be provided on the water discharge port 53. The water discharge port cover 54 is rotatably installed on the water container cover 52. A rotary shaft 54a is provided in the water discharge port cover 54. The water discharge port cover 54 is installed at the water discharge port 53 of the water container cover 52 to be rotatable about the rotary shaft 54a. The water discharge port cover 54 may rotate to open and close the water discharge port 53.

A handle 51 may be provided on the water container 50 to easily move the water container 50.

Accordingly, when the user grasps the handle 51 of the water container 50 and separates the water container 50 from the main body 10 and tilts the water container 50 toward the water discharge port 53, condensate is discharged via the water discharge port 53. Here, the water discharge port cover 54 is pressed and rotated by the condensate and opens the water discharge port 53.

A sealing member 55 for preventing condensate leakage is provided at the water container 50. The sealing member 55 may include a first sealing member 55a provided between the water container cover 52 and end portions of the outer surface portion 50a and the inner surface portion 50b and a second sealing member 55b provided between the water container cover 52 and the water discharge port cover 54.

Meanwhile, a condensate inlet 56 for connecting the water container 50 to the drain pipe 62 during installation of the water container 50 may be formed in the water container 50. A drain port 60 may be provided at the water container installation portion 40 such that the water container 50 may be easily connected to the drain pipe 62 during installation of the water container 50 and the water container 50 is easily separated from the drain pipe 62 during separation of the water container 50.

The drain port 60 may be provided in the first support 41 of the water container installation portion 40. The drain port 60 is formed at an upper end of the first support 41 to protrude toward the water container 50. The drain port 60 connects the drain pipe 62 to accommodating space 50d of the water container 50 during installation of the water container 50. Condensate in the water collecting tray 27 is supplied to the accommodating space 50d of the water container 50 via the drain pipe 62 connected to the water container 50.

Through such a structure, condensate may be guided to flow sequentially from the water collecting tray 27 to the accommodating space 50d of the water container 50 through the drain pipe 62 and the drain port 60.

Meanwhile, a sensor module 100 configured to detect installation of the water container 50 and measure a condensate level in the water container 50 is provided at the first support 41 of the water container installation portion 40.

The sensor module 100 may be provided to measure the condensate level stored in the accommodating space 50d of the water container 50 and detect installation of the water container 50.

FIG. 10 is a perspective view illustrating the sensor module according to one embodiment of the present disclosure, FIG. 11 is an exploded perspective view illustrating the sensor module according to one embodiment of the present disclosure, FIG. 12 is a cross-sectional view taken along line B-B' of FIG. 7 when the sensor module operates in a case in which the water container of the dehumidifier according to one embodiment of the present disclosure has been separated from a main body, FIG. 13 is a view illustrating a state in which the sensor module operates in a case in which the water container of the dehumidifier according to one embodiment of the present disclosure is installed in the main body, and FIG. 14 is a view illustrating a state in which the sensor module operates in a case in which the water container installed on the main body is full with water in the dehumidifier according to one embodiment of the present disclosure.

As illustrated in FIGS. 10 to 14, the sensor module 100 may be provided in the water container installation portion 40 on which the water container 50 is installed.

The sensor module 100 may be provided in the first support 41 of the water container installation portion 40. A sensor installation port 41a for installing the sensor module 100 may be formed in the first support 41.

The sensor installation port 41a may be disposed at a center of the first support 41.

The sensor module 100 may include a sensor case 101, a first sensor portion 110 provided in the sensor case 101 and configured to detect whether the water container 50 is installed on the main body 10, a second sensor portion 120 configured to cooperate with the first sensor portion 110 to detect whether the water container 50 is full with water, and an elastic member 130 configured to provide elastic support between the first sensor portion 110 and the second sensor portion 120.

The sensor case 101 may be installed in the sensor installation port 41a of the water container installation portion 40. The sensor installation port 41a may be formed in the first support 41 such that the second sensor portion 120 of the sensor module 100 is installed in the first support 41.

A second sensor cover 122 of the second sensor portion 120, which will be described below, may be provided on the sensor installation port 41a.

The sensor case 101 may include a first sensor accommodating portion 100a for installing the first sensor portion 110, a second sensor accommodating portion 100b for installing the second sensor portion 120, and an elastic member accommodating portion 100c for installing the elastic member 130.

The first sensor portion 110 may include a first sensor 111. The first sensor 111 may include a micro switch. The first sensor 111 may be accommodated in the first sensor accommodating portion 100a of the sensor case 101 and connected to a first wire w1.

A switch 112 of the first sensor 111 may be turned on/off by movement of the second sensor portion 120.

The first sensor 111 of the first sensor portion 110 is provided to detect attachment of the water container 50 using the second sensor portion 120. When the first sensor 111 is turned on, the first sensor 111 transmits a signal indicating that the water container 50 is installed in the water container installation portion 40 to a controller (not shown), and the dehumidifier 1 operates.

When the first sensor 111 of the first sensor portion 110 is turned off, the first sensor 111 transmits a signal indicating that the water container 50 has been separated from the water container installation portion 40 to the controller, and the dehumidifier 1 stops operating.

The second sensor portion 120 may include a second sensor cover 122, a second sensor bracket 123 coupled to the second sensor cover 122 from behind, and a second sensor 121.

The second sensor cover 122 is moveably installed on the sensor installation port 41a of the water container installation portion 40 and comes into contact with the water container 50. The second sensor cover 122 is provided to be pressed by the water container 50 and move forward and backward during installation of the water container 50.

The second sensor 121 may be provided between the second sensor cover 122 and the second sensor bracket 123. The second sensor 121 may be accommodated in the second sensor accommodating portion 100b of the sensor case 101 and connected to a second wire w2 to receive power.

The second sensor 121 may include a capacitive touch sensor. The second sensor 121 may detect an amount of water in the water container 50 coming into contact with the second sensor cover 122 from behind and may transmit the detected amount to the controller.

The second sensor bracket 123 may be provided such that the second sensor 121 is installed and may include a wire installation path 125 through which the second wire w2 is installed and an elastic member installation path 126 in which the elastic member 130 is installed.

The second sensor bracket 123 is provided such that at least a part of a rear surface of the second sensor bracket 123 comes into contact with the micro switch 112 of the first sensor 111. The second sensor bracket 123 may come into contact with at least a part of the first sensor 111 to turn on/off the first sensor 111.

The second sensor bracket 123 includes a coupling protrusion 127b configured to protrude toward the second sensor cover 122 so as to be coupled to the second sensor cover 122. The second sensor cover 122 includes a coupling groove 127a corresponding to the coupling protrusion 127b.

In the embodiment of the present disclosure, although the second sensor cover 122 and the second sensor bracket 123 are illustrated, as an example, as being separately provided and as being coupled by the coupling protrusion and the coupling groove, the spirit of the present disclosure is not limited thereto. For example, the second sensor cover and the second sensor bracket forming the second sensor portion may be integrally provided.

In addition, although the second sensor 121 is illustrated, as an example, as being installed in the second sensor bracket 123, the second sensor 121 may also be installed on a rear surface of the second sensor cover 122.

Meanwhile, the elastic member installation path 126 of the second sensor bracket 123 accommodates the elastic member 130 configured to generate an elastic force. The elastic member 130 generates the elastic force between the second sensor portion 120 and the first sensor portion 110 so that the second sensor portion 120 may reciprocate.

The elastic member 130 may be accommodated in the elastic member accommodating portion 100c of the sensor case 101 and coupled to the elastic member coupling portion 100d to elastically support the second sensor portion 120. In the embodiment of the present disclosure, the elastic member coupling portion 100d is illustrated, as an example, as having a protruding form configured to protrude toward the second sensor portion 120, the spirit of the present disclosure is not limited thereto. For example, the elastic member coupling portion may have various forms configured to elastically support and fix the elastic member.

As illustrated in FIG. 12, in the state in which the water container 50 is not installed in the water container installation portion 40, the sensor case 101 of the sensor module 100 is provided to protrude outward from the sensor installation port 41a of the first support 41.

Here, the micro switch 112 of the first sensor portion 110 of the sensor module 100 is provided in an off state because the micro switch is, due to the first gap 11, not pressed.

The off state of the first sensor portion 110 is a state in which the water container 50 has been removed from the main body 10 to be cleaned or emptied and the dehumidifier 1 does not operate.

Meanwhile, as illustrated in FIG. 13, in the state in which the water container 50 is installed in the water container installation portion 40, the second sensor case 101 of the sensor module 100 is pressed by the water container 50 and moves from a rear of the first support 41.

In a state in which the second sensor cover 122 protrudes outward from the first support 41, the second sensor cover 122 comes into contact with an outer circumferential surface 50a of the water container 50 and moves toward an inside of the first support 41

An interval between the second sensor bracket 123 and the first sensor portion 110 is decreased from a first interval 11 to a second interval 12 due to movement of the second sensor cover 122. The second interval 12 is narrower than the first interval 11.

The micro switch 112 of the first sensor portion 110 is pressed by the second sensor bracket 123 due to movement of the second sensor portion 120. The first sensor portion 110 detects installation of the water container 50 according to an on operation of the micro switch 112.

Meanwhile, the second sensor 121 of the second sensor portion 120 may detect a capacitance of water in the water container 50 installed in the water container installation portion 40 to detect an amount of water in the water container 50.

The second sensor 121 detects, from behind the second sensor cover 122, a water level using a capacitance method without directly coming into contact with water in the water container 50. The second sensor 121 may indicate, through the controller, a state in which the water container 50 is full with water.

The elastic member 130 elastically supports the second sensor portion 120 and returns the second sensor portion 120 to the original location when the water container 50 is removed from the water container installation portion 40.

While exemplary embodiments of the present disclosure have been illustrated and described above. However, the disclosure is not limited to the aforementioned specific exemplary embodiments. Those skilled in the art may variously modify the disclosure without departing from the gist of the disclosure claimed by the appended claims.

The invention claimed is:

1. A dehumidifier comprising:
   a main body including a suction port and a discharge port;
   a heat exchanger in which a refrigerant configured to exchange heat with air introduced through the suction port circulates;
   a water container separably installed on the main body and configured to store condensate generated in a process in which the air introduced through the suction port exchanges heat with the refrigerant;
   a level sensor mounted to the main body and configured to:
      move within the main body based on a separation and an installation of the water container, and
      detect a water level of the water container;
   a container sensor provided in the main body, and configured to detect whether the water container is installed on the main body based on a movement of the level sensor; and
   a sensor case configured to accommodate the container sensor and the level sensor.

2. The dehumidifier of claim 1, wherein:
   the container sensor includes a micro switch; and
   the level sensor includes a capacitive touch sensor.

3. The dehumidifier of claim 1, wherein the container sensor includes a micro switch.

4. The dehumidifier of claim 1, wherein the level sensor includes a capacitive touch sensor.

5. The dehumidifier of claim 1, wherein the level sensor is further configured to:
   be pressed by the water container and to move toward the container sensor during the installation of the water container; and
   move away from the container sensor during the separation of the water container.

6. The dehumidifier of claim 1, wherein the level sensor is further configured to:
   turn on the container sensor during the installation of the water container; and
   turn off the container sensor during the separation of the water container.

7. The dehumidifier of claim 1, wherein the container sensor cooperates with the level sensor.

8. The dehumidifier of claim 1, further comprising an elastic member configured to elastically support the level sensor from the sensor case to move the level sensor toward the water container.

9. The dehumidifier of claim 1, wherein the level sensor is further configured to detect a capacitance of water when the water container is full with water.

10. The dehumidifier of claim 1, further comprising a water container installation portion provided on the main body to allow the water container to be installed,
wherein the container sensor and the level sensor are provided in the water container installation portion.

11. The dehumidifier of claim 10, further comprising a drain port provided in the water container installation portion so as to be connected to the water container during the installation of the water container and separated from the water container during the separation of the water container.

* * * * *